United States Patent [19]

Paullin

[11] Patent Number: 4,629,641

[45] Date of Patent: Dec. 16, 1986

[54] VENTILATED BOOT

[76] Inventor: Dale W. Paullin, 1446 State Rte. 60, Ashland, Ohio 44805

[21] Appl. No.: 666,497

[22] Filed: Oct. 30, 1984

Related U.S. Application Data

[63] Continuation-in-part of Ser. No. 633,953, Jul. 24, 1984, abandoned, Continuation-in-part of Ser. No. 633,952, Jul. 24, 1984, which is a continuation-in-part of Ser. No. 627,092, Jul. 2, 1984, abandoned.

[51] Int. Cl.$^4$ ............................................. B32B 3/26
[52] U.S. Cl. ..................................... 428/36; 138/121; 92/34; 428/184
[58] Field of Search .................. 138/121; 74/566, 608; 428/36, 184; 92/34–37, 104

[56] References Cited

U.S. PATENT DOCUMENTS

| | | | |
|---|---|---|---|
| 3,897,849 | 8/1975 | Mossner et al. | 180/90.6 |
| 4,396,574 | 8/1983 | Kovacs | 264/533 |
| 4,424,834 | 1/1984 | Sumi et al. | 138/121 |
| 4,515,842 | 5/1985 | Kovacs | 138/121 |

OTHER PUBLICATIONS

A and A Product Bulletins 6F-100 (1977), DS-100 (1966), RB-200 (1967), DD2-A (1966), 6F-300 (1969), PR-1006 (1983), and DVS-200 (1980).

Primary Examiner—John E. Kittle
Assistant Examiner—James J. Seidleck
Attorney, Agent, or Firm—Renner, Otto, Boisselle & Lyon

[57] ABSTRACT

A boot for enclosing and protecting an object. The boot includes a vent in the form of at least one tube projecting from the boot and open to the atmosphere for the admission or escape of air. Preferably, a second tube similar to the first and projecting from the opposite end of the boot permits passage of air through the boot to prevent excess moisture accumulation.

6 Claims, 14 Drawing Figures

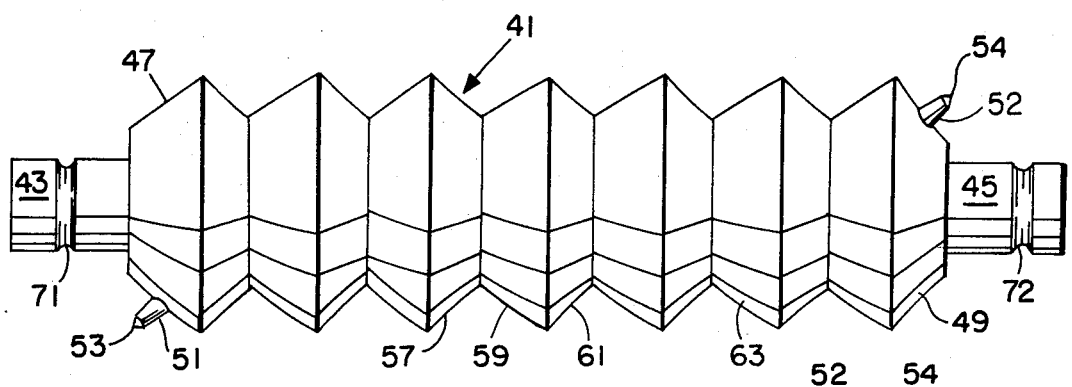
FIG. 4
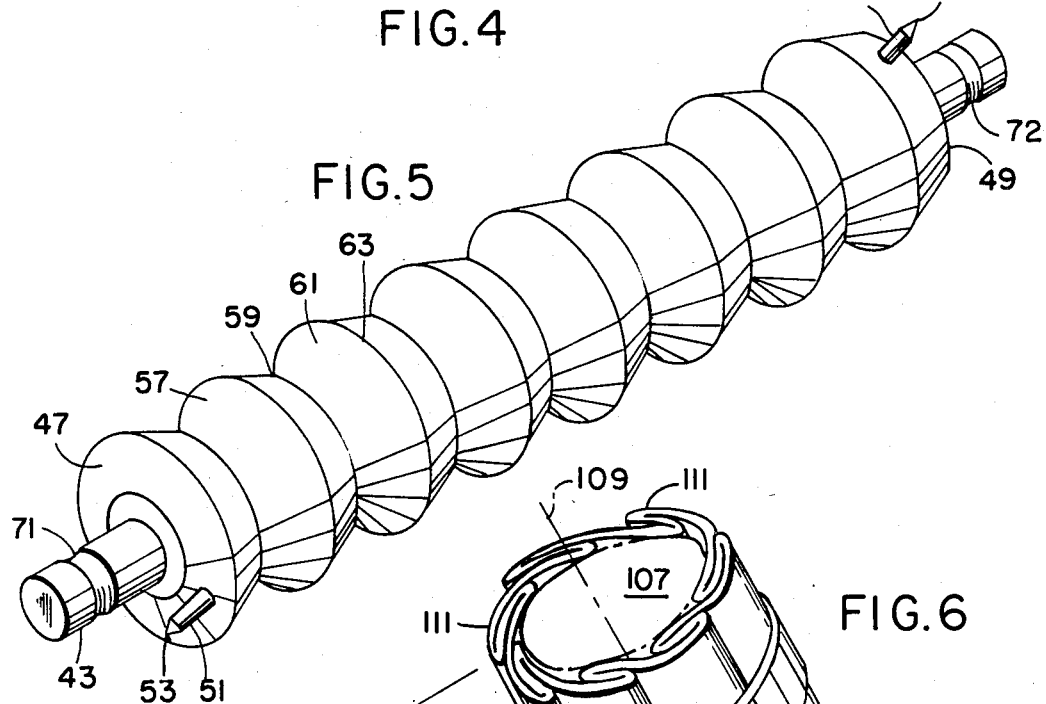
FIG. 5
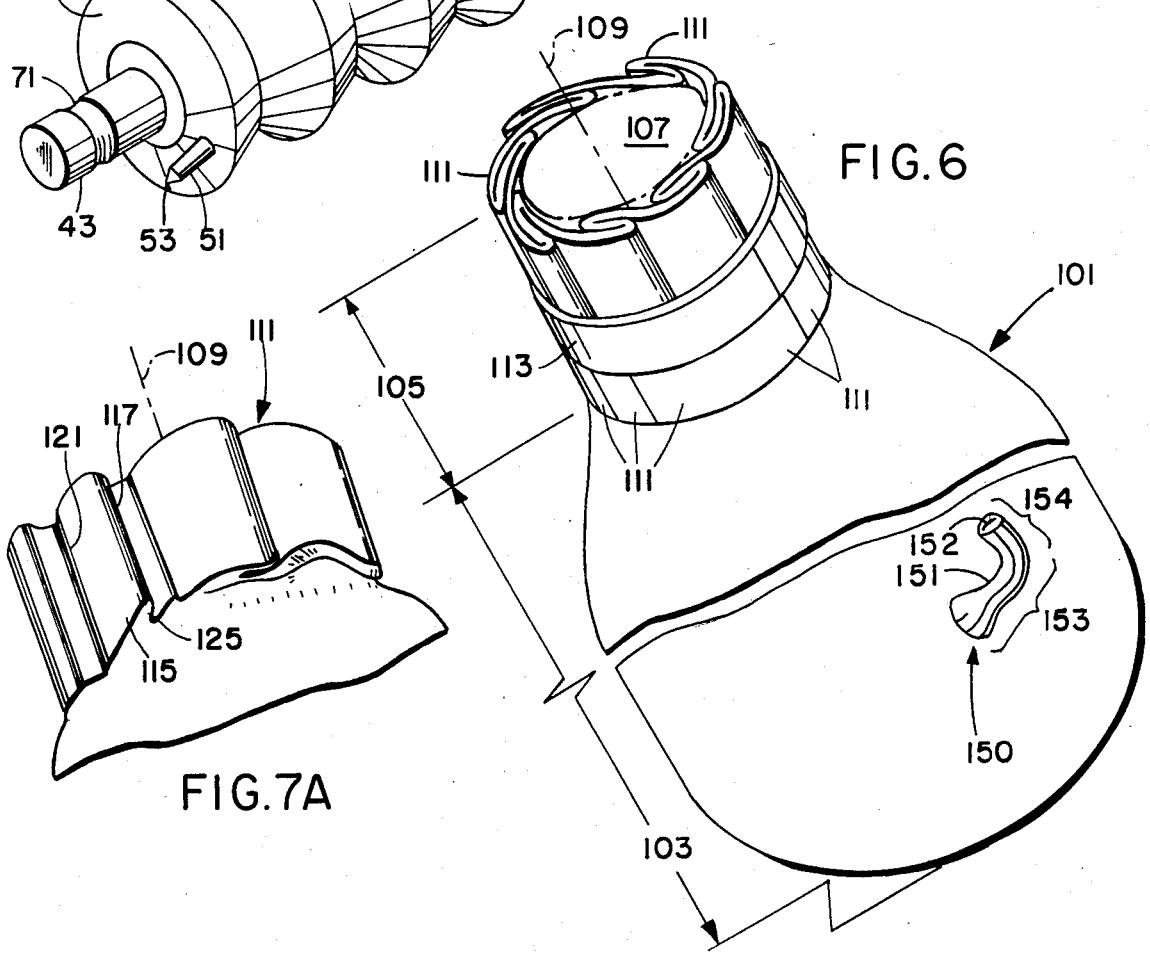
FIG. 6
FIG. 7A

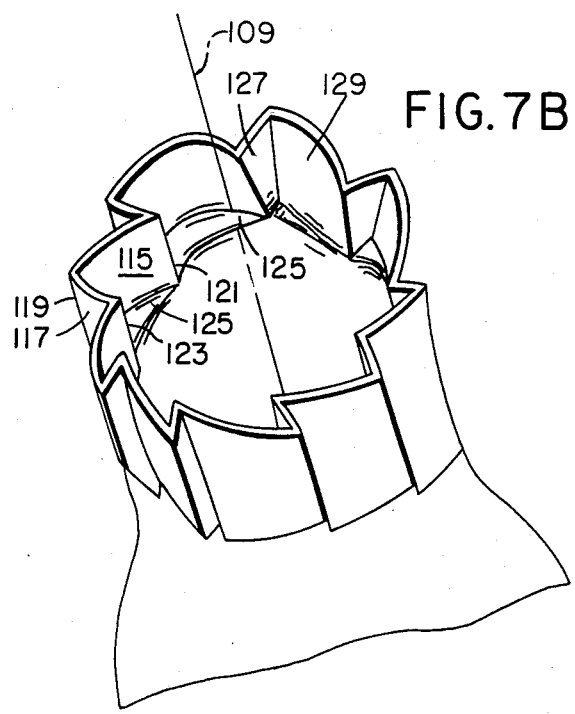
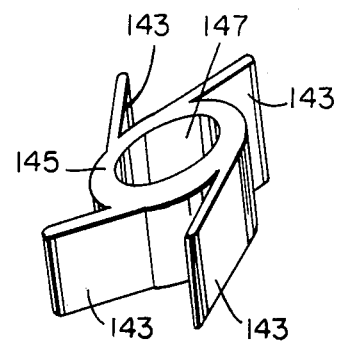
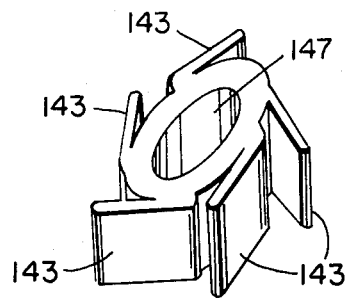
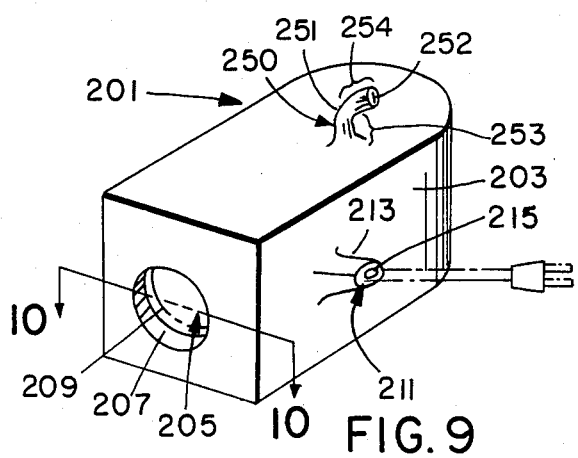
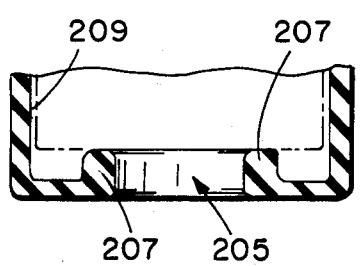
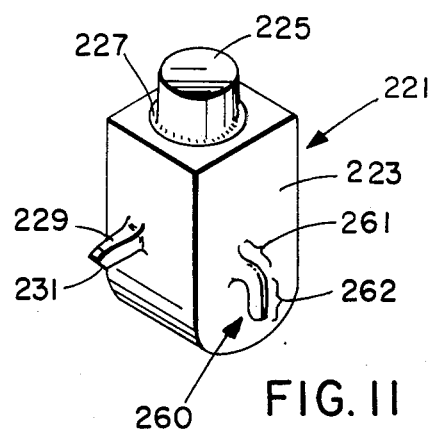

VENTILATED BOOT

CROSS-REFERENCE TO RELATED APPLICATIONS

This is a continuation-in-part of copending U.S patent application Ser. No. 633,953 filed July 24, 1984, abandoned of copending U.S. patent application Ser. No. 633,952 filed July 24, 1984, and of copending U.S. patent application Ser. No. 627,092 filed July 2, 1984 abandoned. Appropriate entitlement to the filing date of each of said earlier application is hereby claimed.

BACKGROUND

This invention relates to boots for protecting objects from adverse environmental influences. Some examples are boots for: protecting drive mechanisms for antennas; electrical devices such as convertors, motors and terminals; air deflectors on trucks; and, operating, manipulative, power and control components of robotics. Such boots are useful for both indoor and outdoor applications.

Rubber boots for the protection of objects from the environment are known. It is also known to prepare elastomeric boots having bellows that fit over objects or mechanical joints that bend or extend and contract. The bellows permits the motion without destruction of the boot.

When boots are used over objects kept indoors or outdoors under varying temperature conditions there is a tendency for condensation to form inside them which may be damaging to the protected parts. In addition, when such boots are extended or compressed by movement of the objects in them, the boots may be bulged or collapsed if air cannot be exchanged rapidly enough with the atmosphere.

During compression, bellows type boots may kink and the resulting bunching can interfere with the desired mechanical movement of the object within the boot. All the foregoing problems have been observed in boots used to protect the drive mechanisms that are used to aim reflector antennas used to receive satellite signals and other movable objects such as air deflectors for trucks.

Similar problems of moisture collection have also been found to occur with nonexpandable boots, such as can be used to cover electrical devices like convertors, motors and terminals.

There has been a traditional problem in providing an appropriate opening in the boot. If the boot is to fit tightly against the projecting element, the opening must be relatively small. But a small opening makes installation of the boot over a relatively large article difficult, risking tearing if the boot has to be stretched too much.

Numerous solutions to the problem of making a protective boot with an opening have been suggested. U.S. Pat. No. 1,278,271 to Wilkins shows a boot for a gear shift lever having a metal base, a fabric bag extending from the base and ending in a drawstring arrangement for closing the bag. U.S. Pat. Nos. 2,093,672 to Golden and 3,285,093 to Sellmeyer disclose flexible guards that depend on the resiliency of the materials to seal the guards to gear shift levers. U.S. Pat. No. 3,897,849 to Mossner shows a brake pedal boot that includes a lengthwise velcro closure. This boot may be installed from the side, the closure joined, and the top clamped to the lever on the pedal avoiding the necessity of passing the pedal through an opening in the bag.

SUMMARY OF THE INVENTION

The problems of moisture collection, influx and efflux of air and kinking observed in using bellows type boots are solved in the invention. In the invention, a boot is made of an elastomer, such as neoprene. A bellows having a series of pleats is prepared by coating a mandrel with liquid elastomer, and curing and stripping the coating from the mandrel. The mandrel provides not only for the forming of the usual pleats between the ends of a bellows, but provides for a vent. In one form, the vent is a tube projecting from one end of the bellows. The tube allows air to be drawn to the boot when it is extended and to be expelled when the boot is compressed. The tube is formed by attaching a rod to the mandrel and cutting the end off the projection that is formed over the rod by the elastomer coating. Preferably the rod terminates in a pinched end so that the open exposed end of the tube is a slit. A slit excludes rain, etc. from the bellows but permits sufficient air flow in and out of the bellows. Preferably, tube type vents are formed at both ends of the bellows to permit air to flow through the bellows while it is stationary so that excess moisture is swept out.

Each end of the bellows terminates in a wall including a hole formed to slip over the object being protected when the boot is installed. A flange projecting from the hole lies tangentially to the protected object and may be clamped to the object to make a tight seal. Preferably, raised ring portions are included on the inside of the flanges for further sealing.

The kinking problem is solved by making the pleats, i.e. the bellows folds and adjoining webs, asymmetrical. Every second web is made wider than its neighbors. The wider web bulges slightly making it convex and its neighbors concave. When the bellows is compressed, the concave webs nest briskly into the convex webs to form a neat package. This structure is not susceptible to kinking.

A mandrel for making the inventive boot appears to be a series of frustums joined together, large base to large base and small base to small base. A mandrel for preparing a boot including the assymetrical pleats would bear the shape of frustums prepared from similar conical solids, but having two different vertex angles so that their respective small and large bases have the same area.

The present invention also permits the insertion of an article of large cross section into a boot through a variable area mouth. A boot, preferably formed of an elastic material, is preferably constructed to enclose an article snugly. The boot may be open or closed at its far end and includes a mouth opening at its near end. The mouth is constructed to include a number of pleats that may be opened for the insertion or withdrawal of an article or closed so that the boot fits tightly around the neck of the article. Each pleat has opposing faces that are preferably of unequal area so that the pleats are naturally biased to lie adjacent the article neck. An elastic band can press the pleats to lie adjacent to the neck of the article and keep the boot mouth in its closed position. The boot is provided with one or more vents for permitting air circulation.

Another embodiment is a boot having a relatively large opening in its body. The boot is preferably elastic so that the opening can be stretched for insertion into the boot of the object to be protected. The opening provides for air circulation to avoid moisture collection in the boot. To make a tight fit to the object, the boot opening is reinforced by a thickened wall portion disposed peripherally around the opening. A vent is also provided for providing for further air circulation. The boot may have other openings to permit electrical and/or mechanical access to the object within the boot.

This embodiment of the boot can be simply fabricated by preparing a form in the shape of the object to be enclosed. A raised portion is added to the form in the shape of the reinforced opening desired and a groove is cut in the form peripherally at the junction of the form and raised portion. This grooved form is then coated with an elastomer so that a thickened wall portion is formed in the groove. The coating is cured, trimmed as necessary and stripped from the form. The vent is formed by using on a projection on the form and by slicing a slit into the projecting vent after the coating is cured.

Preferably, the aforementioned vents are tubular in shape. A first portion of the tube is fastened to the body of the boot. A second portion of the tube is fastened at an angle to the first portion. There is a slit, preferably in the second portion. By this construction, air can be exchanged between the inside of the boot and the outside air while still protecting the inside from rain and other unwanted elements.

BRIEF DESCRIPTION OF THE DRAWINGS

FIG. 4 is a side view of a mandrel for preparing an embodiment of a boot of the type shown in FIG. 1.

FIG. 5 is a perspective view of a mandrel for preparing an embodiment of a boot of the type shown in FIG. 1.

FIG. 6 is a perspective view of another boot including an embodiment of the invention, the mouth portion of the boot being closed.

FIGS. 7A and 7B are, respectively, perspective views of the portion of an open mouth of a boot and of an entire open mouth of a boot of the type shown in FIG. 6.

FIGS. 8A and 8B are perspective views of a form for a mouth usable to prepare a boot of the type shown in FIG. 6.

FIG. 9 is a perspective view of still another embodiment of a boot according to the invention.

FIG. 10 is a cross sectional view of a part of a boot of the type shown in FIG. 9 and its reinforced opening.

FIG. 11 is a perspective view of a form usable to fabricate a boot of the type shown in FIG. 9.

DESCRIPTION OF PREFERRED EMBODIMENTS

A first embodiment

Figure 1:
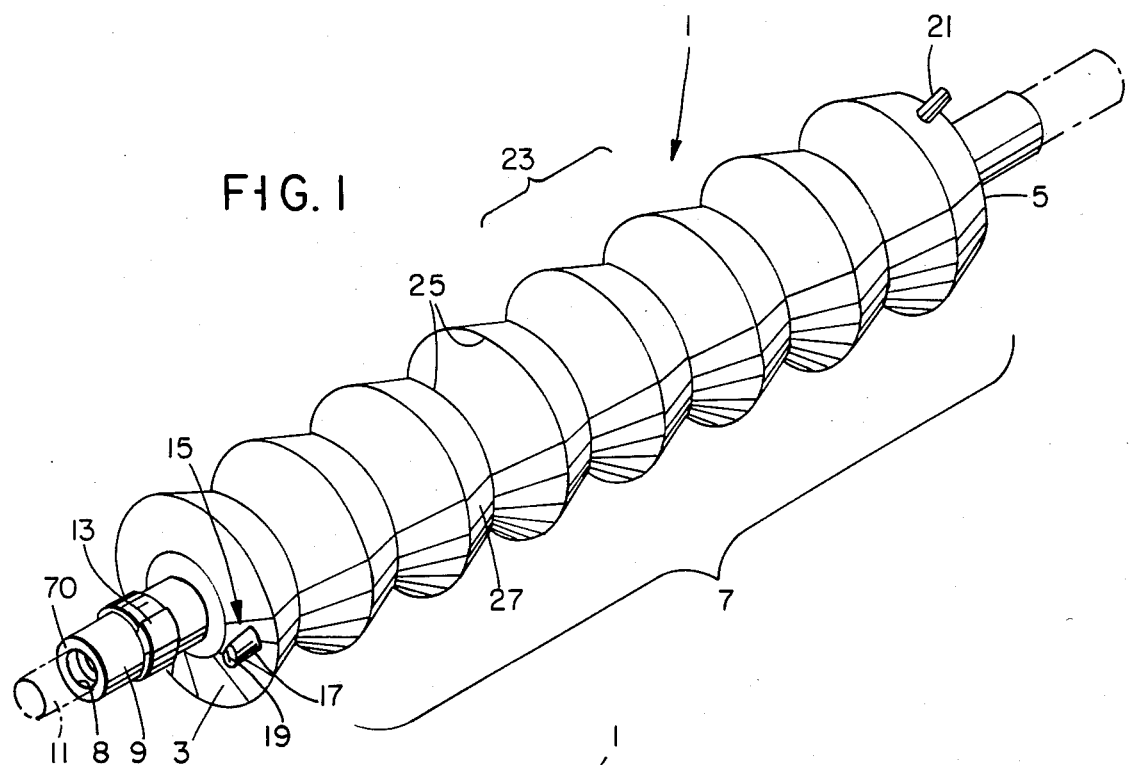
FIG. 1 is a perspective view of an embodiment of a boot according to the invention.

A perspective view of an embodiment of a boot 1 according to the invention is shown in FIG. 1. Boot 1 has opposing ends 3 and 5. Between them extends a bellows 7 for increasing or reducing the distance between ends 3 and 5 by the extension, compression or bending of bellows 7. End 3 includes a hole 8 from the periphery of which an outwardly projecting flange 9 extends. Flange 9 is dimensioned to fit snugly and tangentially about an arm 11 (shown in broken lines) of an object (not shown) that boot 1 is intended to enclose and protect. The object is enclosed inside boot 1 when the boot is in use and another arm may project from a hole in end 5 of boot 1 with another flange engaging that arm. A clamp 13 holds flange 9 tightly against arm 11 to make a good seal. Boot 1 is installed by slipping the object to be protected through hole 8. Preferably the boot is fabricated of an elastic material that may be stretched as necessary to insert the object.

It is preferred that ends 3 and 5 and bellows 7 be of unitary construction. Typically, the boot is made from an elastomer, such as neoprene as is explained hereinafter. The objects enclosed and protected by the tubular bellows part of the boot might be a telescoping drive unit for aiming an antenna reflector that has arms extending from both ends of the boot. When the drive unit is actuated, bellows 7 is extended or contracted. Flange 9 is but one sort of attachment means for sealing the boot to projecting arms of the object within the boot. The clamp shown is an electrical cable tie that includes a ratchet to prevent it from loosening. A convention hose clamp or other suitable clamping means could be used as well to seal the boot.

Preferably, the inside of each end also has a raised ring portion 70 which further serves to help seal the boot. These raised ring portions can be likened to the inside half of an O-ring formed on the inside of the end. Preferably, the raised ring portions are integrally formed as part of the boot according to process described below.

Figure 2:
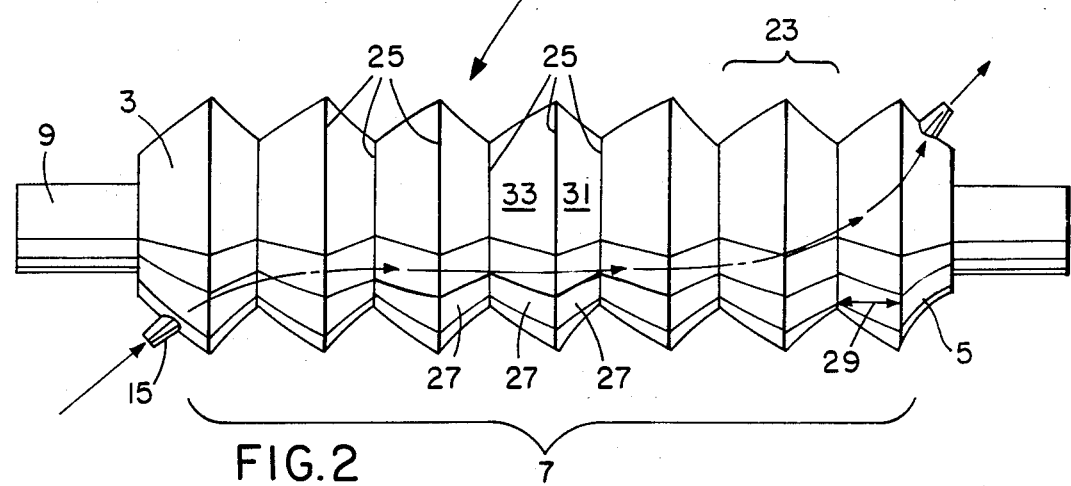
FIG. 2 is a side view of an embodiment of a boot of the type shown in FIG. 1 showing (by line with arrows) an air flow path through the boot.

A vent 15 projects from end 3. The vent has a tubular portion 17 terminating in a slit 19. Vent 15 provides communication between the atmosphere and the inside of boot 1. When bellows 7 is stretched or compressed, vent 15 allows air to enter or exit boot 1 to avoid collapse or ballooning of the boot. Preferably, a second vent 21 projects from end 5, as best seen in FIG. 2. These two vents not only prevent collapse and ballooning, but also allow air to circulate through the inside of boot 1, as indicated by the path shown by the line with arrows in FIG. 2, while the boot is stationary. While the arrows show the air going in vent 15 and out vent 21, it should be understood that the air may also follow a reverse path. The air circulation prevents undesired moisture collection in the boot resulting from condensation. A larger opening than slit 19 could be provided on the vent. However, a slit is preferred to exclude rain and the like from the interior of the boot. The slit must be stable enough not to collapse on itself and block the vent when air is flowing in.

Figure 3A:
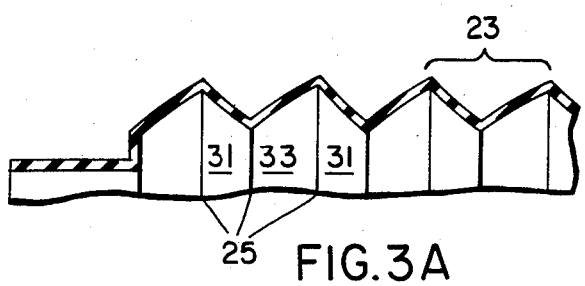
FIG. 3A is a cross sectional view of a portion of an embodiment of a boot of the type shown in FIG. 1 showing extended pleats.
Figure 3B:
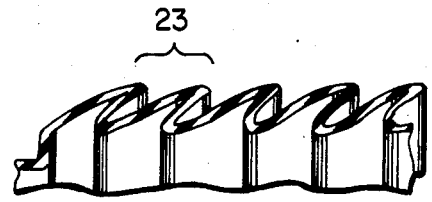
FIG. 3B is a cross sectional view of a portion of an embodiment of a boot of the type shown in FIG. 1 showing compressed pleats.

Bellows 7 comprises a plurality of pleats 23, some of which are shown in FIGS. 3A and 3B. Those pleats include alternatingly opposed folds 25. That is, each fold flexes in the direction opposite from that of its nearest neighbors. Folds 25 form closed geometrical figures that are disposed circumferentially and transversely to arm 11. In the depicted embodiment, those folds are circular, but they may be any other closed curved or polygonal figure. Folds 25 define the limits of annular webs 27 that span the folds. Each web 27 has a minimum dimension or width 29 measured between the adjacent folds that define the web.

Boot 1 might balloon or collapse if it were not vented. That result could interfere with the changes in dimension of the object in the boot, for example, caused by actuation of the drive mechanism that is part of the object. Likewise, if the pleats of the boot kink or bunch upon compression or bending of bellows 7, then movement of the enclosed object could be restricted. Pleats 23 are constructed to avoid kinking when bellows 7 is compressed.

As best seen in the FIGS. 3A and 3B, partial cross sectional views of the boot, a means to avoid kinking is provided by making adjacent webs of different widths. In the depicted embodiment, two different web widths are used alternatingly, but a larger number of different web widths could be used to produce the same function. As shown in FIG. 3A, the cross section of the narrower web 31 is generally planar, but the wider web 33 has a non-planar, slightly convex shape when bellows 7 is stretched. When bellows 7 is compressed, web 31, because of its narrower width, snaps into a concave shape received by web 33 to assume the position of FIG. 3B. This snap-action nesting assures that the pleats stack as desired when bellows 7 is compressed so that no kinking occurs. In the embodiment shown, all the pleats have the same outside and inside fold diameters, but the invention is not so limited. Depending upon the shape of the object to be enclosed, the pleat folds may not be circular nor need their dimensions be constant between the ends of the boot.

The boot embodiment illustrated is simply made from an appropriate mandrel such as is shown in FIGS. 4 and 5. The mandrel is dimensioned to be slightly longer than the fully extended length of the boot made from it to compensate for the resiliency of the material from which the boot is made. Mandrel 41 may be formed from wood or metal and includes arms 43 and 45 projecting from its ends 47 and 49, respectively. Rods 51 and 52 terminating in pinched ends 53 and 54, respectively, project from ends 47 and 49, respectively, for forming vents. Grooves 71 and 72 are provided in the arms for forming raised ring portions such as shown at 70 in FIG. 1.

Mandrel 41 contains a center portion including a plurality of similar sections. The shape of that central portion is the same as would be formed if a number of frustums of conical solids were joined. Frustums have two substantially parallel bases, one having larger area than the other. The shape formed here is as if those frustums were joined large base to large base and small base to small base to form the pleating portion of the mandrel.

The frustums could all be identical. However, the illustrated mandrel provides for forming asymmetrical pleats comprising a means for avoiding kinking of the bellows. Referring to FIG. 4, a typical section of mandrel 41 includes four frustum shapes 57, 59, 61 and 63. Frustums 57 and 61 are identical in the embodiment shown as are frustums 59 and 63. As explained before, the frustums are joined large base to large base and small base to small base. As is clear from the figure, all small bases and large bases are of the same respective areas to avoid discontinuities at the pleat fold lines. This matching requirement combined with the asymmetrical pleating requirement, means that the vertex angles of the conical solids from which the alternating sets of frustums (e.g. 57 and 61, 59 and 63) are prepared must differ. As earlier noted, the conical solids from which the frustums are theoretically cut need not be circular cones and a plurality of frustum sizes may be used to make the outside dimension of the bellows vary along its length.

Once an appropriate mandrel, such as 41 is prepared, it is coated with a liquid elastomer, such as by dipping in neoprene. The coating is cured and stripped off the mandrel. Some trimming may be required to permit stripping of the mandrel and, of course, the ends of the coating formed over rods 51 and 52 is trimmed off to open the vent tubes. As seen in FIG. 5, those rods have converging or pinched ends 53 and 54 to aid in formation of the desired slit opening.

A second embodiment

FIGS. 6, 7A, 7B, 8A and 8B show another embodiment of the invention. A bag 101 having a bag portion 103 and a mouth portion 105 contains an article of which only the cross section 107 of a neck portion can be seen. In general, the neck would protrude beyond mouth portion 105, but is shown cut off for clarity. In the figure the boot encloses the article entirely and has only one mouth portion. It is within the scope of the invention for the boot to be open ended, or to have one or more additional mouth portions or other openings. One purpose of the mouth portion or other openings is to permit mechanical, electrical or other access to, or means of actuation of, the enclosed article. In one application, such as is illustrated in FIG. 6, the boot is formed of a material such as a rubber or other elastomer molded to fit tightly about the article and to accommodate all mechanical or electrical connections by mouth portions such as the one shown or through other openings molded to fit tightly around electrical cables or the like, none of which are illustrated. This tight fit excludes dirt and moisture to protect the enclosed article.

The boot 101 further includes a vent 150 projecting from bag portion 103. The vent 150 has a tubular portion 151 terminating in a slit 152. The vent has a first portion 153 attached to the boot. The vent also has a second portion 154 attached to the first portion and at an angle to the first portion. Slit 152 is preferably formed in second portion 154. Vent 150 provides communication between the atmosphere and the inside of the boot. The vent allows air to circulate through the boot. The air circulation prevents undesired moisture collection in the boot resulting from condensation. A larger opening than slit 152 could be provided on the vent. However, a slit is preferred so as to exclude rain and the like from the interior of the boot. The slit must be stable enough not to collapse on itself and block the vent. This can be accomplished by coating an appropriately shaped mandrel with a liquid elastomer, such as neoprene, and thereby forming the boot. The mandrel has a projection for forming the vent. After the coating is cured, the boot is stripped off the mandrel. The vent 150 then consists of the tubular portion. The vent is completed by cutting slit 152 into the end of the vent. This can be accomplished by simply snipping the end of the vent with a hot knife. Alternatively, the slit could be made in the vent even before the boot is stripped. It should be understood that more than one vent can be used so as to further facilitate the circulation of air through the boot. Indeed, it is often preferable to have two vents so that a pathway for air circulation is provided, with one vent being the inlet and the other vent being the outlet for the air.

The bend in the vent formed by the angle between its first portion 153 and second portion 154 further serves to keep rain and the like out of the boot. Preferably, the angle is about 90°. Preferably, the bend is oriented so that the vent projects either up or down when the boot is placed on the object to be protected. The choice of orientation between up or down is generally made on the basis of ease of stripping from the mandrel during the making of the boot.

It is important to note that, as shown in FIG. 6, the article has one or more shoulders. That is, the article in the boot has a greater transverse cross sectional area than does the mouth portion of the boot when it is closed, as shown in FIG. 6. For greater clarification, a central axis 109 is shown generally perpendicular to the neck surface 107. The article would be inserted into or withdrawn from the boot generally along this axis and surfaces generally perpendicular to it are referred to here as transverse. In the invention, the mouth portion also has an open position, discussed below, that has a much larger transverse area than does the mouth portion when it is closed. The larger mouth area simplifies insertion and removal of the article and reduces the probability of tearing the boot.

Mouth portion 105 includes a plurality of pleats 111 around the circumference of the neck of the article. When the mouth portion is closed, as shown, pleats 111 are folded and lay against the neck of the article to provide a tight closure. As shown in the figure, a retaining band 113 encircles the pleats 111 and holds them in place when the mouth portion is closed. Band 113 may be a simple rubber band having sufficient width, according to the width of the pleats 111, to hold the pleats in place.

Flexible pleats 111 are readily distinguished from pleated closures used in paper containers for liquids in the past. An example of such fixed pleats in a paper container is shown in U.S. Pat. No. 4,191,322 to Kinney. Those pleats are fixed and do not flex to aid filling or emptying the container.

In FIGS. 7A and 7B, the mouth portion of boot 101 is shown opened with pleats 111 separated. FIG. 7A shows a few of the pleats from below, whereas the view of FIG. 7B is from the top of the boot. These figures illustrate a preferred construction of pleats 111. Each pleat 111 includes two opposing longitudinal (i.e., generally parallel to central axis 109) side walls 115 and 117, respectively. Taking a single pleat, those side walls each have two longitudinal edges that form folding axes for the pleats, just as traditional pleats in garments do. The opposing side walls 115 and 117 are joined along a common longitudinal edge 119 to form one folding axis. Opposite longitudinal edges 121 and 123, of walls 115 and 117, respectively, form the second and third axes of this one pleat as well as one axis of each of the adjacent pleats. A bottom wall 125 connects side walls 115 and 117 forming a corner in this pleat construction. Bottom wall 125 intersects side walls 115 and 117 at their common longitudinal edge 119 and extends from that axis to the boot, spanning folding axes 121 and 123. It is also possible to construct the pleats without a bottom wall as shown for the pleat having side walls 127 and 129 in FIG. 7B. By virtue of the flexible nature of the material from which the boot is preferably formed, side walls 127 and 129 simply taper into the bag portion of the boot without formation of a corner. Pleats 111 fold together to reduce the area of mouth portion 105 to a minimum area as shown in FIG. 6. When pleats are unfurled the area of the mouth portion is greatly increased as indicated in FIG. 7B. Of the two pleat constructions described, those without a bottom wall provide a larger area on the open position of the mouth position.

The side walls on the pleats may have the same area; however, as shown in FIG. 7B it is preferred that the side walls have differing areas, in an alternating pattern. If, as is preferred, the boot is formed of neoprene or other resilient material, the differing size side walls naturally urge the pleats to lay flat, i.e., toward the neck of an article in the boot. This biasing means urges the pleats toward the closed position of the mouth portion to enhance the integrity of the closure of the mouth portion. In the pictured pleats, side walls 117 and 127 are of smaller area than are side walls 115 and 129, respectively.

The mouth portion of boots according to the invention are easily made. The bag portion may be made by conventional means. First, a body form having the form of the article to be enclosed in the boot or any other desired shape is prepared. Next, a mouth form for the mouth portion is prepared. FIGS. 8A and 8B illustrate two mouth form embodiments.

Each mouth form includes a plurality of vanes 143 projecting from the side of a form core 145 that may be circular, elliptical or another cross sectional shape to form the desired mouth shape according to the shape of the neck of the article to be enclosed in the boot. In FIG. 8A vanes 143 form an acute angle with core 145; in FIG. 8B, the vanes are tangentially joined to core 145. The latter attachment, or one having vanes 143 lying even closer to core 145, is preferable to obtain the desired biasing force urging the pleats toward the closed position of the mouth portion. Core 145 may be metal and vanes 143 welded to it. If it is desired to form a mouth portion without bottom walls in the pleats, then the vanes 143 must be shaped to form a smooth transition between them and the body form.

Core 145 may contain a central aperture 147 or other suitable means for attachment to the body form. When those forms are attached to each other, the assembly is coated with an elastomer, for example by dipping it into a liquid neoprene that coats the assembled forms. The coating is then cured and peeled off the form as the desired boot. It may be necessary to trim the boot before stripping it from the form.

The mouth portion aids in stripping the boot from the form just as it aids in inserting the article. It provides a large opening so that the boot mouth may be stretched to a relatively wide opening without undue risk of tearing the boot. In fact, it could be desirable to form a boot in this manner in order to reduce losses in production, but to remove the mouth portion before sale or use.

The inventive boot need not be formed of neoprene or another elastomer, but also could be made of other materials depending upon its application. The boot could include a fabric reinforcement or other strengthening means.

A third embodiment

FIGS. 9–11 show still another embodiment of the invention. In FIG. 9 an embodiment of a boot 201 according to the invention is shown in perspective view. Boot 201 includes a body that is shaped in its fabrication to generally confirm to the shape of an object 209 inserted into the boot for protection. Preferably, boot 201 has a relatively thin elastic wall allowing some stretching as the object is inserted into the boot, but contracting to conform to the shape of the object.

Boot 201 includes a reinforced opening 205 in body 203 through which an object may be inserted into boot 201 or withdrawn from it. Opening 203 is reinforced by a thickened wall 207. That thickened wall is peripherally disposed along the edge of opening 203 to strengthen the opening and to prevent it from tearing as it is stretched to pass an object in and out of the boot. In addition, the reinforcing provides a good seal between the boot and the object 209 enclosed within it.

Preferably, boot 201 is made from an elastomer, such as neoprene. The natural resilience of the material is useful in making a good seal between thickened wall 207 and object 209, shown in broken lines in FIG. 10. As shown there, it is preferred that the thickened wall be disposed on the inside of boot 201 and that the construction be unitary. The snug fit of boot 201 on object 209 causes thickened wall 207 to be held against object 209 to exclude the entry of foreign matter along the sides of the object. Opening 205 does permit air to pass freely in and out of the boot so there is no moisture buildup from condensation and the like.

Boot 201 also includes a second opening 211 through which electrical and/or mechanical access may be gained to the object inside boot 201. Preferably, opening 211 is in the form of a tube 213 extending from body 203 and terminating in a slit 215 so that a relatively tight seal is obtained against whatever passes through opening 211. Generally there is no need to reinforce opening 211.

Boot 201 may be made using a form 221 shown in FIG. 11. Form 221 has a body having the same shape as the object to be protected by boot 201. In order to prepare the reinforced opening, a raised portion 225 has been joined to body 223. Raised portion 225 has the shape and size of the opening desired. A groove 227 has been cut in body 223 along the periphery of raised portion 225 for the formation of the thickened wall portion. A projection 229 having a pinched off end 231 is provided to produce a second opening.

Form 221, thus prepared, is coated with a liquid elastomer. The coating builds up on form 221 approximately uniformly, except for an increased thickness in groove 227 which is filled with the liquid. The coating is cured, trimmed as necessary and stripped from form 221 to form an embodiment of the inventive boot. Any coating formed over the end of projection 229 is cut off to create opening 211 and to permit stripping of the form.

Boot 201 further includes a projecting vent 250. This vent has a tubular portion 251 with a slit 252. The vent provides communication between the atmosphere and the inside of the boot. The vent allows air to circulate through the boot. Thus, vent 250 and opening 205 both permit air circulation in a cooperative fashion and still serve to exclude rain and other unwanted foreign matter. The air circulation prevents undesired moisture collection in the boot resulting from condensation. Vent 250 has a first portion 253 attached to the boot. Vent 250 also has a second portion 254 and at an angle to the first portion. Slit 252 is preferably formed in second portion 254. A larger opening than a slit could be used on the vent, but a slit is preferred so as to exclude air and the like from the interior of the boot. The slit must be stable enough not to collapse on itself and block the vent. This construction can be obtained using the form 221 of FIG. 11 and coating it with a liquid elastomer as described above. The form 221 has a second projection 260 joined to body 223. Second projection 260 has a first portion 261 attached to the body of form 221 and a second portion 262 attached at an angle to the first portion. In other words, second projection 260 has the shape and size of the desired vent 250. After the coating has cured the boot is stripped from the form and slit 252 sliced into vent 250. This can be done by simply slicing off the end of the vent with a hot knife. Alternatively, the slice can be placed in the vent before stripping.

The bend in the vent formed by the angle between its first portion 253 and second portion 254 further serves to keep rain and the like out of the boot. Preferably, the angle is about 90°. Preferably, the bend is oriented so that the vent projects either up or down when the boot is placed on the object to be protected. The choice of orientation between up or down is generally made on the basis of ease of stripping from the mandrel during the making of the boot.

The invention has been described with respect to certain preferred embodiments. Those skilled in the art will recognize various modifications and additions within the spirit of the invention.

For example, boots according to the invention can be made from any elastic material resembling rubber including vinyl.

In addition, boots according to the invention can be made by other methods including, blow molding, injection molding, and spin molding.

What is claimed is:

1. An elastomeric boot for protecting an object from environmental influences, said boot comprising:
   a flexible tubular enclosure having opposing ends and having an interior for containing an object with variable dimensions and for protecting said object from environmental influences external to said enclosure;
   tubular attachment means extending from at least one of said ends for securing said enclosure to said object;
   a circumferential ridge on the inside of said tubular attachment means for engaging and securing with said object;
   expansion means extending from and between said ends for varying the distance between said ends in response to changes in the dimensions of said object;
   air exchange means for allowing influx of ambient air into the enclosure or eflux of interior air from the enclosure in response to an air pressure differential between the air inside the enclosure and air outside the enclosure comprising at least two tubular projections integrally formed with the boot and communicating with the interior of the enclosure; and
   water or dirt exclusion means for excluding water or dirt from the enclosure through the air exchange means comprising an end portion of said projection having a cross sectional area substantially smaller than the cross sectional area of the tubular projection, one of said projections being proximate one end of said enclosure and another of said projections being proximate the opposing end of said enclosure.

2. The boot of claim 1 wherein the exclusion means further includes a cross-sectional area, the plane of which is substantially vertical when the enclosure is used to enclose an object.

3. The boot of claim 1 wherein the exclusion means further includes a slit in the end of the tubular projection.

4. The boot of claim 1 wherein the tubular projection undergoes a transition from a generally circular cross section at the juncture of the boot and the tubular projection to an essentially linear cross section at the end portion of the projection, the length of the linear cross section being equal to or less than a diameter of a circular cross section at the juncture of the boot and tubular projection, and a slit formed in the end portion of the projection having an essentially linear cross section.

5. The boot of claim 1 wherein the projection includes a central axis extending from the juncture from the tubular projection to the end portion, the central axis being bent.

6. The boot of claim 4 wherein the projection includes a central axis extending from the juncture from the tubular projection to the end portion, the central axis being bent.

* * * * *